United States Patent
Kramer

(10) Patent No.: US 8,534,433 B2
(45) Date of Patent: Sep. 17, 2013

(54) ELASTIC CONNECTION ELEMENT WITH VARIABLE RIGIDITY

(75) Inventor: Klaus Kramer, Neuenkirchen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 291 days.

(21) Appl. No.: 12/936,979

(22) PCT Filed: Apr. 6, 2009

(86) PCT No.: PCT/DE2009/050016
§ 371 (c)(1),
(2), (4) Date: Nov. 2, 2010

(87) PCT Pub. No.: WO2009/124543
PCT Pub. Date: Oct. 15, 2009

(65) Prior Publication Data
US 2011/0036672 A1    Feb. 17, 2011

(30) Foreign Application Priority Data

Apr. 9, 2008 (DE) .......................... 10 2008 001 097

(51) Int. Cl.
*F16F 9/10* (2006.01)
(52) U.S. Cl.
USPC ... 188/312; 188/266.6; 188/313; 188/321.11; 267/217; 280/124.106
(58) Field of Classification Search
CPC .......................................................... F16F 9/30
USPC . 188/322.16, 322.2, 314, 315; 280/124.101, 280/124.106, 124.107, 124.13, 124.137, 280/124.149, 124.152, 124.121, 124.123
See application file for complete search history.

(56) References Cited

U.S. PATENT DOCUMENTS

| | | | | |
|---|---|---|---|---|
| 3,215,229 A * | 11/1965 | Bunnell | ........................ | 188/312 |
| 4,191,280 A * | 3/1980 | Copperwheat | ................ | 188/300 |
| 4,613,153 A | 9/1986 | Shibahata et al. | | |
| 4,641,856 A | 2/1987 | Reichenbach | | |
| 4,706,989 A * | 11/1987 | Iijima et al. | ................ | 280/5.524 |
| 4,786,034 A * | 11/1988 | Heess et al. | ................ | 267/64.15 |
| 4,834,419 A * | 5/1989 | Kozaki et al. | ............... | 280/5.503 |
| 4,844,506 A | 7/1989 | Morigushi et al. | | |
| 4,936,423 A * | 6/1990 | Karnopp | ..................... | 188/266.5 |
| 4,973,077 A | 11/1990 | Kuwayama et al. | | |
| 4,981,199 A * | 1/1991 | Tsai | .............................. | 188/312 |
| 5,161,822 A * | 11/1992 | Lund | ...................... | 280/124.106 |
| 5,217,245 A | 6/1993 | Guy | | |
| 5,286,013 A * | 2/1994 | Seymour et al. | ............... | 267/220 |
| 5,732,905 A | 3/1998 | Krysinski | | |
| 5,829,556 A * | 11/1998 | Domange | ..................... | 188/268 |
| 5,984,062 A | 11/1999 | Bobrow et al. | | |
| 7,201,260 B2 * | 4/2007 | Diederich et al. | ........ | 188/322.15 |
| 7,314,124 B2 * | 1/2008 | Martyn et al. | ................ | 188/318 |
| 7,717,669 B2 * | 5/2010 | Sheath et al. | ................. | 415/119 |
| 7,984,915 B2 * | 7/2011 | Post et al. | ................... | 280/5.524 |
| 2004/0074720 A1* | 4/2004 | Thieltges | ..................... | 188/318 |

FOREIGN PATENT DOCUMENTS

| | | |
|---|---|---|
| DE | 833 001 | 1/1952 |
| DE | 1 170 620 | 5/1964 |
| DE | 35 36 655 A1 | 4/1987 |
| DE | 42 93 010 B4 | 12/2006 |
| DE | 601 26 180 T2 | 5/2007 |
| EP | 0 234 808 A2 | 9/1987 |
| FR | 2 731 405 A1 | 9/1996 |
| GB | 976 331 | 11/1964 |
| GB | 2 006 131 A | 5/1979 |
| WO | 99/31404 A1 | 6/1999 |

\* cited by examiner

*Primary Examiner* — Thomas Irvin
(74) *Attorney, Agent, or Firm* — Davis & Bujold, PLLC

(57) ABSTRACT

An elastic connection element with variable rigidity for coupling together components that are spaced from each other. The connection element is a tubular component with coupling points which fix the components to the element. The rigidity of the element, in the state of maximum rigidity, is determined substantially by the coupling points. These are formed by a receiving eyelet and an elastomeric bush bearing press-fit therein. The region located between the coupling points forms a piston/cylinder unit, the interior of which comprises at least two chambers that are separated by the piston and which receive a hydraulic or a pneumatic medium. The chambers are interconnected with one another by a connection line containing a controllable valve. By at least partially opening the valve, the rigidity of the connection element can be reduced in relation to the state of maximum rigidity.

11 Claims, 2 Drawing Sheets

ELASTIC CONNECTION ELEMENT WITH VARIABLE RIGIDITY

This application is a National Stage completion of PCT/DE2009/050016 filed Apr. 6, 2009, which claims priority from German patent application serial no. 10 2008 001 097.9 filed Apr. 9, 2008.

FIELD OF THE INVENTION

The invention relates to an elastic connection element having variable rigidity for connecting components, spaced apart from each other, where the connection element, even in a state of maximum rigidity, still has a certain elasticity beyond the elasticity of conventional rigid connection elements.

BACKGROUND OF THE INVENTION

If a technical system is subject to vibrations during its use, its components are generally connected together in such a manner that the connection is elastic, and if necessary, contributes to damping the vibrations introduced into the system. An elastic connection of components is common, particularly in vehicle construction. In this case, relevant elastic connections between components are used for, among others applications, the suspension or fastening of the vehicle unit, and in the domain of chassis suspension. In the latter case, the elastic connection of the parts serves to increase the durability of the connections despite strong loads caused by vibrations that occur during the use of the vehicle, and to damp the vibrations, and thereby serves to decouple vibrations and acoustics of the vehicle and of the body. Due to the highly varied vibration frequencies and amplitudes depending on the road conditions and the vehicle speed, vehicle manufacturers endeavor to design the vehicle suspension such that, from the viewpoint of maximum comfort for vehicle passengers with respect to the damping behavior, the suspension extensively adapts to the different arising conditions.

The vibrations are damped by elastomer bearings disposed at various locations of the vehicle. For an optimal vehicle adaptation in terms of comfort, bearings that are switchable with respect to their rigidity are already known. For this purpose, adjusting cylinders are actuated by means of hydraulic units and are moved into or out of the bearing to vary the spring rate of a respective bearing. However, corresponding solutions are generally quite complex so that, with regard to costs, they are only conditionally suitable to some extent for use in series production.

From U.S. Pat. No. 4,973,077 an arrangement is known for connecting the torsion bar of a vehicle axle to a stabilizer device abutting at the torsion bar, in which the elasticity, or rather, the rigidity of the connection is variable by means of a hydraulic piston/cylinder unit disposed in its area. The cylinder of the corresponding piston/cylinder unit is disposed above the connection point from which projects the piston rod of a piston guided in the cylinder. Two chambers for a hydraulic damping means, separated from each other by the piston, are disposed in the cylinder. These chambers are connected to each other by a line system in which a switchable valve is inserted. The line passages between the chambers can be open or closed by means of the switchable valve, and therefore, the rigidity of the connection points can be switched between a state of minimum rigidity and a state of maximum rigidity. In order to avoid a system overload and a hard impact while in the state of maximum rigidity, that is, with the valve closed, a spiral spring and a pressure relief valve are disposed in each of the chambers. By means of the respective pressure relief valve, a bypass connection between the chambers can be enabled even when the main valve is closed. The construction of the described arrangement is, however, also relatively complex. This increases not only the costs, but possibly also the susceptibility to failure of a vehicle equipped with a corresponding solution. The arrangement serves to connect components directly resting on each other by fastening the components together.

SUMMARY OF THE INVENTION

The object of the invention is to provide an elastic connection element for connecting components, spaced apart from each other, that has a variable rigidity and, with a simple construction, still has a certain minimum elasticity even in the state of maximum rigidity.

The proposed elastic connection element that has variable rigidity and serves to connect components that are spaced apart from each other is designed as a strand-shaped or tubular component with coupling points for fixing to the components that are to be connected to the element. According to the invention, the connection element is designed such that its rigidity, when in a maximum state, is determined substantially by its coupling points. According to the invention, these are formed by a receiving eyelet and an elastomeric bush bearing press-fitted therein. The bush bearings of the coupling points are comprised at least of a metallic inner part, to be fastened to one of the components to be connected, and of an elastomeric bearing body surrounding the inner part and connected to it through vulcanization. According to the invention, a piston/cylinder unit forms the region disposed between the coupling points. At least two chambers that are separated from each other by the piston and are for receiving a hydraulic or pneumatic media, are disposed in the interior of the cylinder of this piston/cylinder unit. These chambers are interconnected by a channel or a connection line having a controllable valve disposed therein. Corresponding to the control of this valve, the connection element assumes the state of maximum rigidity when the valve is closed in which its rigidity is determined almost exclusively by the rigidity of the coupling points or, respectively, of the elastomeric bearing, whereas its rigidity can be reduced by at least partially opening the valve in the connection between the chambers of the piston/cylinder unit.

Corresponding to a practice-oriented embodiment, the connection element according to the invention has two coupling points, each of which is disposed at an axial end of the connection element. The chambers for the hydraulic or pneumatic media, formed in the cylinder of the piston/cylinder unit, are interconnected preferably via an external connection line. The valve is inserted in this connection line that is guided through the cylinder wall in the area of each chamber, and by means of this valve the connection between the chambers is opened, closed or even the flow of the media can be controlled in a continuously variable manner. With respect to the last-cited possibility, the valve according to one possible embodiment is designed as a controllable valve by means of which the cross section of the connection line, available for the circulation of the hydraulic or pneumatic media, is continuously adjustable between a completely closed and a completely open state. To do this, the corresponding valve in this embodiment is controlled by a control signal that is derived from the output of sensors, by means of which the frequency and/or the amplitude of the vibrations acting on the connection element is recorded directly or indirectly. The sensors can be acceleration sensors for example. Preferably, an electromagnetic valve is used.

In a particularly preferred embodiment of the invention, a piston rod that is guided in the cylinder is formed on both sides of the piston of the piston/cylinder unit. This increases the mechanical stability of the connection element. In this case, one of the coupling points is disposed on one of the piston rods on its side facing away from the cylinder, whereas a further coupling point is disposed at the cylinder. In addition, the piston rods in the cylinder are preferably guided in a plain bearing. The plain bearing prevents the hard materials of the pistons and the parts of the cylinder surrounding it from rubbing against each other during the movement of the piston in the cylinder. Furthermore, the named embodiment can be further developed such that, disposed in each of the chambers, there is a disc spring that is slid onto the piston rod arranged at the respective side of the piston. There, the respective disc spring bears against the piston such that the piston is mounted spring-loaded at the chamber wall delimiting the respective chamber, and with vibrations of large amplitudes, the piston does not strongly impact the chamber walls of the piston/cylinder unit. In an embodiment of the invention provided for use in automobile construction, the elastic connection element is a stabilizer link which, as a part of the motor vehicle axle, transfers the movement of the suspension arm relative to the body onto the stabilizer of the axle. In this embodiment with the disc spring mentioned above, the parts of the connection element are dimensioned such that a spring deflection of 1 mm to 2 mm is given for the disc spring in the chamber.

BRIEF DESCRIPTION OF THE DRAWINGS

The invention is described again in more detail in the following based on an example embodiment. The associated drawings show.

DETAILED DESCRIPTION OF THE PREFERRED EMBODIMENTS

Figure 1:
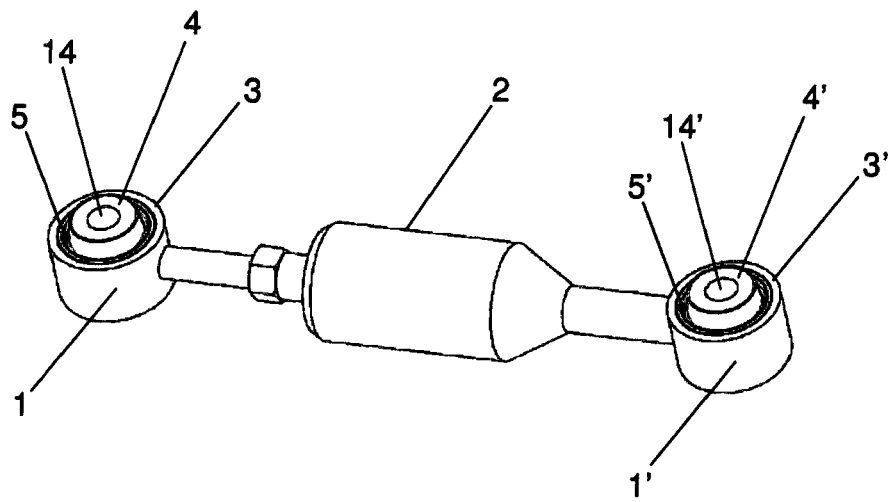
FIG. 1: a spatial representation of a possible embodiment of the connection element according to the invention.

FIG. 1 shows a possible embodiment of the elastic connection element according to the invention in a spatial view. This relates to a stabilizer link for the connection of the suspension arm 22 and the stabilizer of a motor vehicle axle 24. The connection element is designed as a tubular component which in the example shown has two coupling points 1, 1', each of which is disposed at an axial end of the connection element. The coupling points 1, 1' are each realized in the form of a receiving eyelet 3, 3' and an elastomeric bush bearing 4, 5, 4', 5' press-fitted therein. The bush bearings 4, 5, 4', 5' of the coupling points 1, 1' disposed at the axial ends of the connection elements are formed in a known manner, and are comprised of a metallic inner part 4, 4' and an elastomeric bearing body 5, 5' concentrically surrounding the inner part 4, 4' and connected to it through vulcanization. The connection element is fastened, for example by screwing, to each of the components to be connected by it, via bore holes or through openings 14, 14' through the inner parts 4, 4' of the bush bearing 4, 5, 4', 5' of the coupling points 1, 1'. The region 2 between the coupling points 1, 1' is formed as a piston/cylinder unit 6, 7 which can be seen in more detail in FIG. 3.

Figure 2:
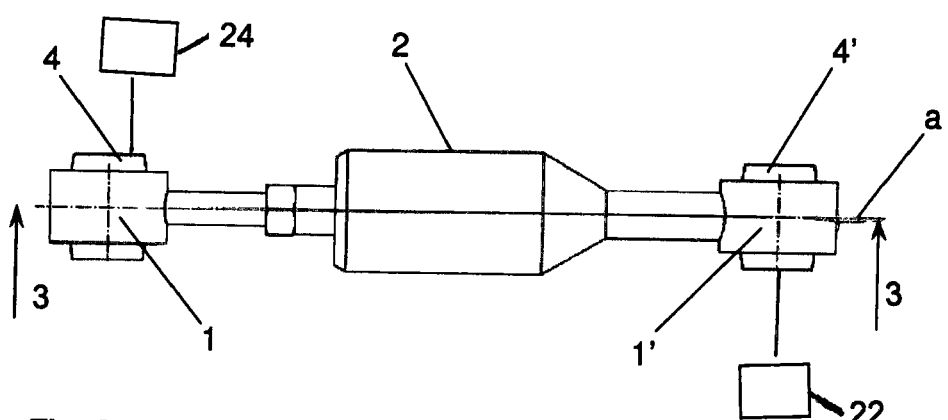
FIG. 2: a side view of the connection element according to FIG. 1, FIG. 3: The connection element according to FIG. 2 in a sectional view with a section following line 3-3.
Figure 3:
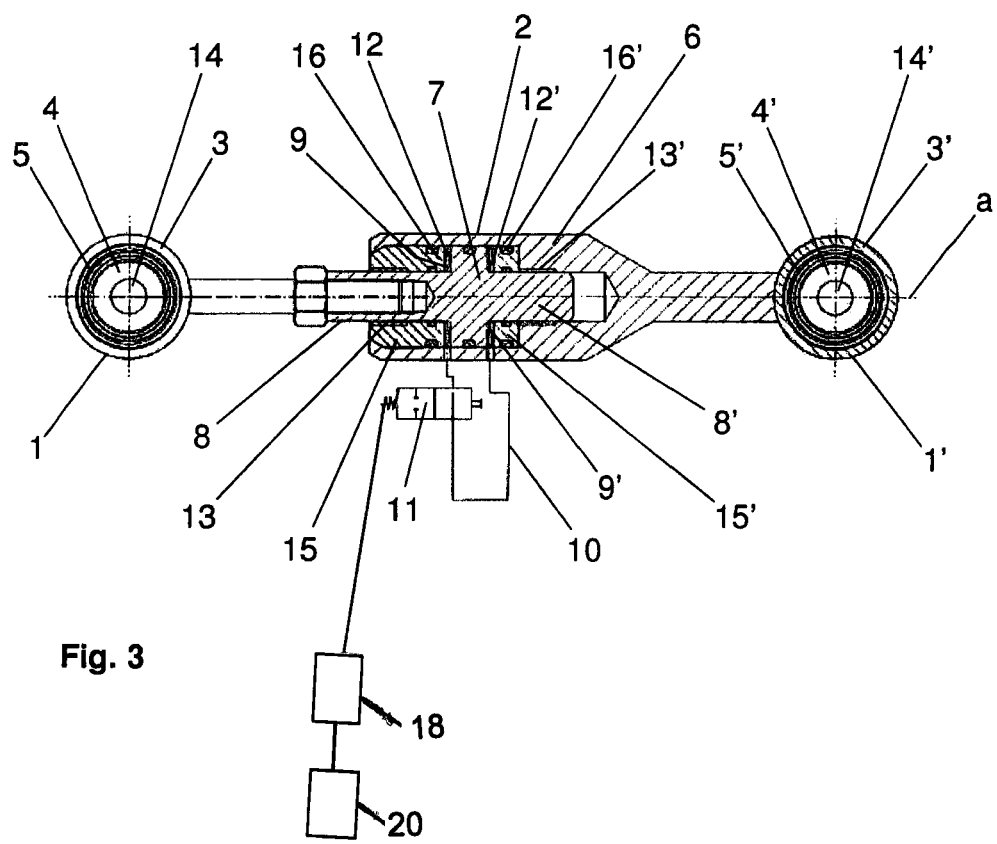

FIG. 2 again shows the elastic connection element according to FIG. 1 in a side view. A section following line 3-3 of this representation is shown in FIG. 3. In FIG. 3, the construction of the piston/cylinder unit 6, 7 formed by the region 2 between the coupling points 1, 1' can be seen so that its functionality is also visible. The piston 7 of the piston/cylinder unit 6, 7 is connected via a piston rod 8 to the coupling point 1 formed by the receiving eyelet 3 and the bush bearings 4, 5 press-fitted therein. As can be seen, the other coupling point is disposed at the cylinder 6. On both sides of the piston 7, 7 in the interior of each cylinder 6, a small-volume chamber 9, 9' is formed in each case for receiving hydraulic media. Between the chambers 9, 9', there is a connection disposed outside of the cylinder 6 in the form of the connection line 10 in which a valve 11 is inserted.

The connection line 10 connecting the chambers 9, 9' and the valve 11 disposed therein are shown only schematically in the representation. In this case, the valve 11 is a controllable valve 11 which is switchable at least for opening and closing the connection path given by the connection line 10 between the chambers 9, 9'. However, if applicable, the valve 11 can also be a valve 11 whose aperture is continuously variable in the range between "closed" and "open". In the latter case, the signals, for example, from acceleration sensors 20, can be evaluated and used to control the valve 11, via a control device 18. The following explanation, however, assumes a switchable valve 11 by means of which the connection line 10 between the chambers 9, 9' can be either closed or opened.

When the valve 11 closes the connection line 10 between the chambers 9, 9', these are locked against each other so that the rigidity of the connection element assumes a maximum value. This corresponds essentially to the rigidity of the elastomeric bush bearings 4, 5, 4', 5' at the coupling points 1, 1' of the connection element. Naturally, using an appropriate design of the bush bearings 4, 5, 4', 5', the rigidity of the connection element can also be differently adjustable in the scope of the manufacturing process as a fundamental rigidity. If the valve 11 is opened, the hydraulic medium can move between the chambers 9, 9' and hence, when a force impacts the piston 7, it can be displaced by the piston of the piston/cylinder 6, 7 unit. The rigidity of the connection element is thereby reduced. The connection element therefore shows a more elastic behavior than in the basic state. According to the embodiment, the valve 11 can be actuated to change the rigidity of the connection element, that is, when it is used use in a motor vehicle, with the aid of the 12 V on-board voltage. To increase the rigidity of the component, the piston 7 is guided in the cylinder 6 on both sides by a piston rod 8, 8'. The piston rods 8, 8' formed on both sides of the piston 7 also run in a slide bearing 13, 13' disposed outside of the chambers 9, 9'. With a reduced rigidity compared to the state of maximum rigidity, the overall rigidity of the connection element in the embodiment shown is also influenced by a disc spring 12, 12' disposed in each of the chambers 9, 9'. The disc springs 12, 12' each bear against the piston 7 such that the piston 7 is supported in an elastic manner with respect to the surfaces delimiting the chambers 9, 9'. As a result, when high vibration amplitudes act on the connection element, a hard impact of the piston 7 against the chamber walls is avoided.

In the example shown, a ring 15, 15' is inserted in the cylinder 6 on both sides of the chambers 9, 9'. These rings 15, 15' make it possible to insert the piston 7 in the cylinder 6 during assembly and to position it, in particular relative to the connection line 10 for connecting the chambers 9, 9', guided through the cylinder wall in the region of the chambers 9, 9', and also to dimension the chambers. Furthermore, the rings 15, 15' serve for positioning the seals 16, 16' by means of which the chambers 9, 9' are sealed against leakage of hydraulic media. In the process, the piston 7 and the piston rod 8 are additionally supported by the ring 15 with respect to forces acting on them.

LIST OF REFERENCE CHARACTERS 1, 1' coupling point
2 region
3, 3' receiving eyelet
4, 4' inner part
5, 5' bearing body
6 cylinder
7 piston
8, 8' piston rod
9, 9' chamber
10 connection line
11 valve
12, 12' disc spring
13, 13' slide bearing
14, 14' bore hole or through-opening
15, 15' ring
16, 16' seal

The invention claimed is:

1. An elastic connection element having variable rigidity for connecting a suspension arm and a stabilizer of a motor vehicle axle that are spaced apart from each other, the connection element either having a strand shape or being tubular, wherein the connection element comprises:

coupling points (1, 1') at which the connection element is fixed to the suspension arm and the stabilizer, a maximum rigidity of the connection element in an axial longitudinal direction (a) is dependent on the elasticity of the coupling points (1, 1'), each of the coupling points comprises a receiving eyelet (3, 3') and an elastomeric bush bearing (4, 5, 4', 5') that is press-fitted into a respective receiving eyelet, each of the elastomeric bush bearings comprises a metallic inner part (4, 4') that is fastened to one of the suspension arm and the stabilizer to be connected, and an elastomeric bearing body (5, 5') that surrounds the inner part (4, 4') and is connected to the inner part (4, 4') by vulcanization;

a region of the connection element between the coupling points (1, 1') comprises a piston and a cylinder, the piston is slidably located in an interior of the cylinder and separates the interior of the cylinder into first and second chambers (9, 9'), for receiving one of a hydraulic medium and a pneumatic medium, the piston and the cylinder are dimensioned such that the combined axial width of the first and the second chambers is less than the axial width of the piston so as to limit axial sliding of the piston;

one of a channel and a connection line (10) connects the first and the second chambers (9, 9');

a valve (11) is disposed in the channel or the connection line and is controllable so as to either only fully open or fully close such that the connection element has a maximum rigidity, when the valve (11) is closed, and the connection element has a reduced rigidity when the valve (11) is open;

one piston rod extends from a first axial side of the piston and another piston rod extends from a second axial side of the piston;

a positioning ring is located in the cylinder on each of the first and the second axial sides of the piston, the positioning rings position the piston within the cylinder relative to the connection line, and each of the positioning rings comprises a seal which respectively seals the first and the second chamber against leakage of the hydraulic media;

a slide bearing is supported on the first axial side of the piston by the positioning ring and the slide bearing supports the piston rod on the first axial side of the piston;

the cylinder supports another slide bearing which supports the piston rod on the second axial side of the piston; and the seals are axially located between the piston and the slide bearing on the respective axial side of the piston.

2. The elastic connection element according to claim 1, wherein the connection element has two coupling points (1, 1') each of which is disposed adjacent an opposed axial end of the connection element.

3. The elastic connection element according to claim 1, wherein the connection line (10) passes through a cylinder wall, and the valve (11) disposed in the connection line (10) and is located outside of the cylinder (6).

4. The elastic connection element according to claim 3, wherein a flow of one of the hydraulic medium and the pneumatic medium, through the connection line (10), is continuously controllable by the valve (11), and the valve (11) is controlled by a control signal transmitted from a control device, the control signal is derived from an output signal of a sensor which detects at least one of a frequency and an amplitude of a vibration acting on the connection element.

5. The elastic connection element according to claim 3, wherein the valve (11) is an electromagnetic valve (11).

6. The elastic connection element according to claim 1, wherein the piston rods are integrally fixed to the piston (7), and one of the coupling points (1) is connected to an end of the piston rod (8) that extends from the first axial side of the piston and passes completely through the respective positioning ring and out of the cylinder (6).

7. The elastic connection element according to claim 6, wherein a respective disc spring (12, 12') is supported by each of the piston rods (8, 8'), and the disc springs (12, 12') are respectively supported against one of the first and the second sides of the piston (7) such that the piston (7) is mounted spring-loaded against a chamber wall delimiting a corresponding one of the first and the second chambers (9, 9').

8. The elastic connection element according to the claim 7, wherein the axial width of the first and the second chambers is such that the disc springs (12, 12') have a spring displacement of about 1 mm to 2 mm.

9. The elastic connection element according to claim 6, wherein the piston rods (8, 8') are slidably supported by the respective slide bearings (13, 13') to slide axially within the cylinder (6) with respect to the positioning rings.

10. The elastic connection element according to claim 1, wherein the connection element is a stabilizer link and connects the suspension arm and the stabilizer of the vehicle axle.

11. An elastic stabilizer link having variable rigidity for connecting a suspension arm and a stabilizer of a motor vehicle axle that are spaced from each other, the stabilizer link comprising:

a tubular component with coupling points (1, 1') that are located adjacent opposed ends of the tubular component;

each coupling point comprises a receiving eyelet (3, 3') and an elastomeric bush bearing (4, 5, 4', 5'), the bush bearings are press-fitted in the respective receiving eyelet (3, 3'), each of the bush bearings (4, 5, 4', 5') comprising a metallic inner part (4, 4') and an elastomeric bearing body (5, 5'), the suspension arm and the stabilizer are fixed to the inner part and the elastomeric bearing body (5, 5') receives and is vulcanized to the inner part (4, 4');

a cylinder (6) and a piston (7) being located in a region (2) of the tubular component between the coupling points (1, 1');

the piston (7) being received by and axially slidable within the cylinder (6), the piston being slidable between a first axial end position and a second axial end position;

the piston (7) dividing an interior of the cylinder (6) into two chambers (9, 9'), the two chambers (9, 9') being located on axially opposed sides of the piston (7) and connected with one another by a conduit (10) which comprises a valve (11);

the valve (11) communicating with a controller which receives output signals from a sensor and transmits control signals for controlling the valve (11) such that, depending on the output signal from the sensor, the valve (11) is only either fully closed or fully opened, and when the valve (11) is closed, the two chambers (9, 9') are isolated from one another and the stabilizer link has a maximum rigidity, and when the valve (11) is open, a pressure medium flows between the two chambers (9, 9') and rigidity of the stabilizer link is less than the maximum rigidity;

the piston has first and second piston rods that extend from the piston in opposite axial directions;

a first positioning ring is located within the cylinder and together with the piston axially define one of the two chambers;

a second positioning ring is located within the cylinder and together with the piston axially define the other of the two chambers;

a first disk spring is arranged in the one of the two chambers and encircles the first piston rod, the first disk spring contacts the first positioning ring and the piston so as to load the piston toward the first axial end position;

a second disk spring is arranged in the other of the two chambers and encircles the second piston rod, the second disk spring contacts the second positioning ring and the piston so as to load the piston toward the second axial end position, the first and the second positioning rings are axially spaced from each other such that axial sliding of the piston between the first and the second axial end positions is limited up to 4 mm by deflection of the springs;

the first positioning ring supports a first seal and a first slide bearing, the first seal being axially located between the first slide bearing and the piston, and the first slide bearing supports the first piston rod;

the second positioning ring supports a second seal;

the cylinder supports a second slide bearing and the second slide bearing supports the second piston rod; and the second seal and the second slide bearing are supported such that the second seal is axially located between the second slide bearing and the piston, the first and the second seals respectively preventing leakage of pressure medium from the first and the second chambers axially past the first and the second positioning rings.

* * * * *